United States Patent
Urbanczyk, II

(10) Patent No.: US 10,710,518 B2
(45) Date of Patent: Jul. 14, 2020

(54) LICENSE PLATE BRACKET

(71) Applicant: Ronald Urbanczyk, II, San Antonio, TX (US)

(72) Inventor: Ronald Urbanczyk, II, San Antonio, TX (US)

( * ) Notice: Subject to any disclaimer, the term of this patent is extended or adjusted under 35 U.S.C. 154(b) by 44 days.

(21) Appl. No.: 16/059,217

(22) Filed: Aug. 9, 2018

(65) Prior Publication Data

US 2019/0077338 A1  Mar. 14, 2019

Related U.S. Application Data

(63) Continuation-in-part of application No. 29/645,813, filed on Apr. 30, 2018.

(60) Provisional application No. 62/556,269, filed on Sep. 8, 2017.

(51) Int. Cl.
| | | |
|---|---|---|
| *B60R 13/10* | (2006.01) | |
| *G09F 3/20* | (2006.01) | |
| *F16B 47/00* | (2006.01) | |
| *G09F 7/10* | (2006.01) | |
| *F16B 21/09* | (2006.01) | |
| *G09F 7/18* | (2006.01) | |

(52) U.S. Cl.
CPC ............ *B60R 13/105* (2013.01); *F16B 47/00* (2013.01); *G09F 3/203* (2013.01); *G09F 7/10* (2013.01); *F16B 21/09* (2013.01); *G09F 2007/1852* (2013.01)

(58) Field of Classification Search
CPC .......... B60R 13/10; B60R 13/105; G09F 7/10
See application file for complete search history.

(56) References Cited

U.S. PATENT DOCUMENTS

| | | | | |
|---|---|---|---|---|
| 1,175,652 | A * | 3/1916 | Marquette | G09F 3/20 40/649 |
| 1,752,883 | A * | 4/1930 | Busenbark | B60R 13/105 40/209 |
| 1,779,234 | A * | 10/1930 | Sherwood | B60R 13/105 40/203 |
| 2,057,461 | A * | 10/1936 | Walton | B60R 13/105 40/203 |
| 2,192,561 | A * | 3/1940 | Seeley | B60R 13/105 40/209 |
| 2,603,013 | A * | 7/1952 | Sherwood | B60R 13/105 40/209 |

(Continued)

FOREIGN PATENT DOCUMENTS

| | | | | |
|---|---|---|---|---|
| CH | 393115 | A * | 5/1965 | ........... B60R 13/105 |
| CH | 631925 | A5 * | 9/1982 | ........... B60R 13/105 |

(Continued)

*Primary Examiner* — Eret C McNichols
(74) *Attorney, Agent, or Firm* — Boudwin Intellectual Property

(57) ABSTRACT

A license plate bracket. The license plate bracket includes a frame having a front wall, a rear wall, and a sidewall extending therebetween, defining a channel therein. An opening is disposed along an upper side of the frame providing access to the channel. A first cutout is disposed in the front wall, the first cutout placed such that it can expose identifying information of a license plate disposed within the channel. A plurality of fasteners are affixed to the front wall at each corner thereof, the plurality of fasteners able to removable secure the frame to a support surface.

17 Claims, 3 Drawing Sheets

(56) References Cited

U.S. PATENT DOCUMENTS

| | | | | |
|---|---|---|---|---|
| 2,603,015 | A * | 7/1952 | Knipple | B60R 13/105 40/202 |
| 2,618,089 | A * | 11/1952 | Rose | B60R 13/105 40/204 |
| 2,710,475 | A * | 6/1955 | Salzmann | B60R 13/105 40/202 |
| 2,831,281 | A * | 4/1958 | Nayman | B60R 13/105 40/209 |
| 2,910,793 | A * | 11/1959 | Easton | B60R 13/10 40/209 |
| 2,921,395 | A * | 1/1960 | Louis | B60R 13/105 40/209 |
| 3,315,394 | A * | 4/1967 | Kluck | B60R 13/105 40/209 |
| 3,835,563 | A * | 9/1974 | Hanstad | B60R 13/105 40/209 |
| 3,900,979 | A * | 8/1975 | Eggenschwiler | B60R 13/105 40/209 |
| 3,914,890 | A * | 10/1975 | Behlen, Jr. | G09F 7/02 40/597 |
| 4,038,770 | A * | 8/1977 | Bott | B60R 13/105 40/209 |
| 4,170,838 | A * | 10/1979 | Bott | B60R 13/105 40/209 |
| 4,171,584 | A * | 10/1979 | Kaiser | G09F 7/10 40/109 |
| 4,182,062 | A * | 1/1980 | Krokos | B60R 13/105 40/209 |
| D303,403 | S * | 9/1989 | Barcom | D20/43 |
| 4,891,895 | A * | 1/1990 | DeLaquil, Jr. | B60R 13/10 40/201 |
| 4,903,422 | A * | 2/1990 | Varga | B60R 13/105 40/201 |
| 4,953,315 | A * | 9/1990 | Romaine | G09F 11/00 116/44 |
| 5,012,602 | A * | 5/1991 | Storey | B60R 13/105 40/201 |
| D326,870 | S * | 6/1992 | Giammanco | D20/42 |
| 5,131,177 | A * | 7/1992 | Sy, Jr. | B60R 13/10 40/591 |
| 5,141,191 | A | 8/1992 | Coffield | |
| D337,837 | S * | 7/1993 | DeLosa, Jr. et al. | D20/42 |
| 5,235,768 | A * | 8/1993 | Eder | G09F 7/10 40/488 |
| 5,266,144 | A * | 11/1993 | Gaeto, Jr. | G09F 21/04 156/306.6 |
| 5,386,960 | A | 2/1995 | O'Brien | |
| 5,404,664 | A * | 4/1995 | Brooks | B60R 13/105 40/202 |
| 5,494,247 | A * | 2/1996 | Louder | B60R 13/105 248/187.1 |
| 5,503,420 | A * | 4/1996 | Consiglio | B60R 13/105 280/288.4 |
| D382,598 | S * | 8/1997 | Schroeppel | D20/42 |
| 5,771,619 | A * | 6/1998 | Wells | G09F 7/10 40/643 |
| D399,264 | S * | 10/1998 | Klink | D20/42 |
| 5,870,841 | A * | 2/1999 | Brody, II | B60R 13/105 40/200 |
| 5,950,339 | A * | 9/1999 | Lucier | B29B 13/065 40/209 |
| D425,565 | S * | 5/2000 | Bowie | D20/42 |
| 6,167,645 | B1 * | 1/2001 | Gasko | B60R 13/105 293/115 |
| 6,347,471 | B1 * | 2/2002 | Mirza | G09F 15/0025 40/594 |
| 6,367,182 | B1 | 4/2002 | Olson, Jr. | |
| 6,385,876 | B1 * | 5/2002 | McKenzie | B60R 13/10 40/201 |
| 6,449,889 | B1 * | 9/2002 | Hottenstein | G09F 7/04 340/473 |
| 6,688,027 | B2 * | 2/2004 | Fink | G09F 7/00 206/575 |
| 6,760,986 | B1 * | 7/2004 | MacNeil | G09F 7/002 277/641 |
| 9,211,850 | B2 * | 12/2015 | Marko, Jr. | B60R 13/105 |
| D802,506 | S * | 11/2017 | Bargen | D12/193 |
| 2002/0124444 | A1 * | 9/2002 | Davidson | B60R 13/10 40/209 |
| 2003/0079392 | A1 * | 5/2003 | Newman | B60R 13/105 40/661 |
| 2004/0079847 | A1 | 4/2004 | Tatta | |
| 2004/0244240 | A1 * | 12/2004 | Yen | B60R 13/00 40/209 |
| 2005/0252050 | A1 * | 11/2005 | Menke | B60R 13/00 40/209 |
| 2007/0069089 | A1 | 3/2007 | Christopherson | |
| 2007/0257166 | A1 * | 11/2007 | Christopherson | B60R 13/105 248/205.5 |
| 2008/0098629 | A1 * | 5/2008 | Graham | B60R 13/10 40/201 |
| 2008/0229634 | A1 * | 9/2008 | Collins | B60R 13/105 40/209 |
| 2010/0101123 | A1 * | 4/2010 | Pacleb | B60R 13/105 40/209 |
| 2010/0294901 | A1 * | 11/2010 | Kreft | B60R 13/105 248/205.3 |
| 2010/0330322 | A1 * | 12/2010 | Goodrich | B32B 7/12 428/42.1 |
| 2011/0247248 | A1 * | 10/2011 | Dowd | B60R 13/105 40/209 |
| 2011/0283574 | A1 * | 11/2011 | Ellman | B60R 13/10 40/209 |
| 2016/0068095 | A1 * | 3/2016 | Angara | B60R 13/105 224/277 |
| 2019/0287432 | A1 * | 9/2019 | Shaw-Smith | G09F 23/06 |

FOREIGN PATENT DOCUMENTS

| | | | | |
|---|---|---|---|---|
| CH | 658226 | A5 * | 10/1986 | B60R 13/105 |
| CH | 659905 | A5 * | 2/1987 | B60R 13/105 |
| DE | 2644554 | A1 * | 4/1978 | B60R 13/105 |
| DE | 2804611 | A1 * | 8/1979 | B60R 13/105 |
| DE | 2833500 | A1 * | 2/1980 | B60R 13/105 |
| DE | 3644470 | A1 * | 7/1988 | B60R 13/105 |
| DE | 4224888 | C1 * | 8/1993 | B60R 13/105 |
| DE | 9309476 | U1 * | 8/1993 | G09F 7/12 |
| DE | 4339657 | C1 * | 3/1995 | B60R 13/105 |
| DE | 102009024755 | A1 * | 12/2009 | B60R 13/105 |
| EP | 1275596 | A1 * | 1/2003 | G09F 7/10 |
| GB | 2150727 | A * | 7/1985 | B60R 13/105 |

* cited by examiner

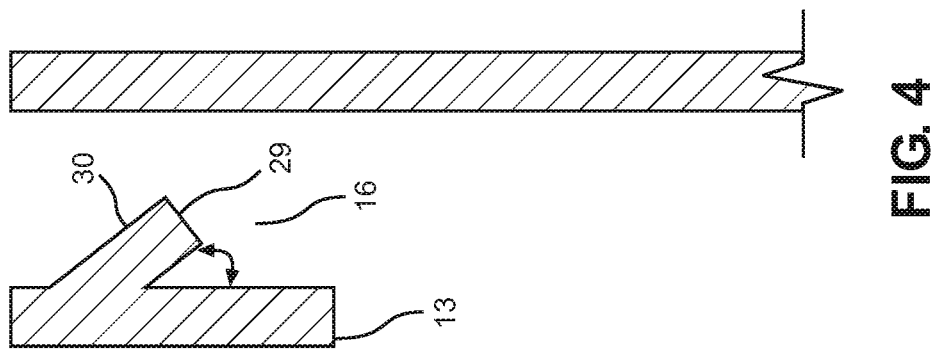
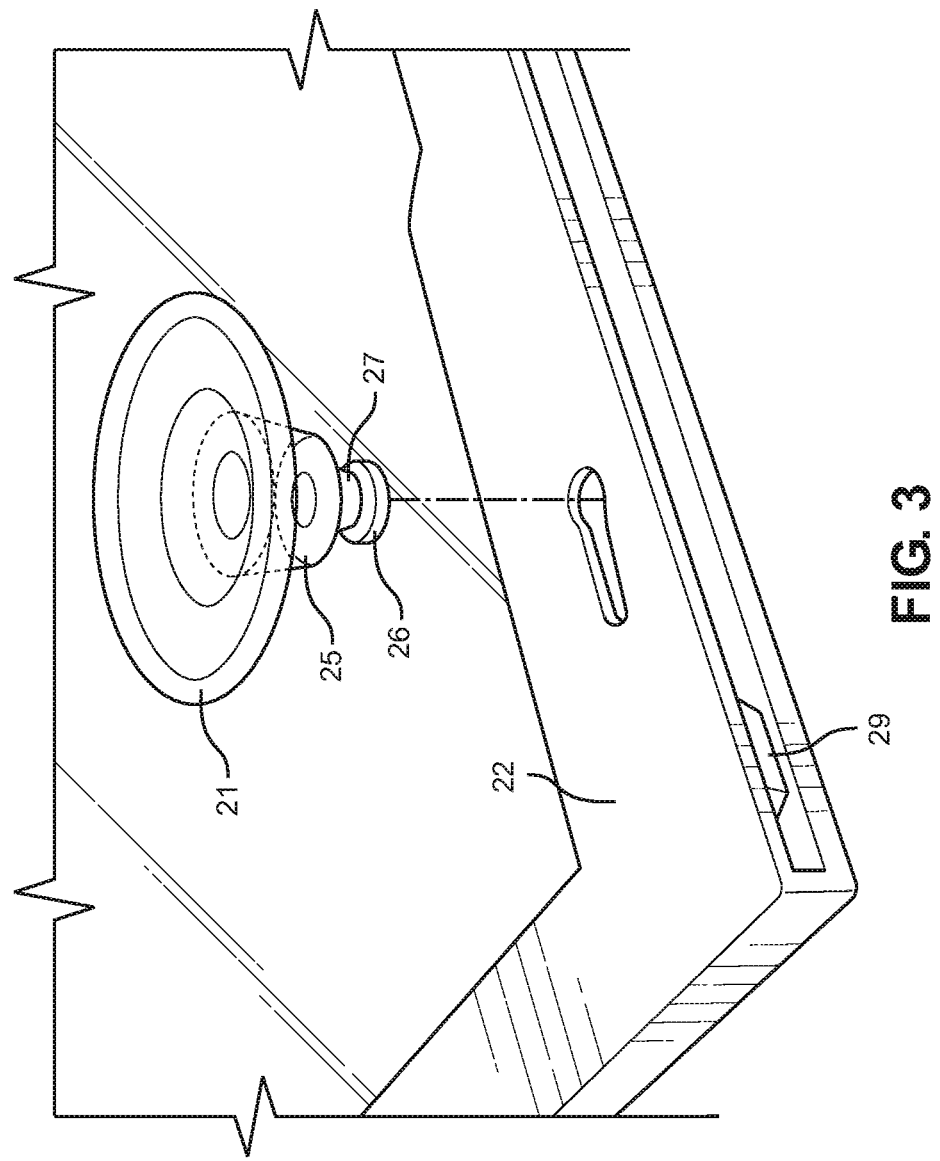
FIG. 3
FIG. 4

LICENSE PLATE BRACKET

CROSS REFERENCE TO RELATED APPLICATIONS

This application claims the benefit of U.S. Provisional Application No. 62/556,269 filed on Sep. 8, 2017 and U.S. patent application Ser. No. 29/645,813 filed on Apr. 30, 2018. The above identified patent applications are herein incorporated by reference in its entirety to provide continuity of disclosure.

BACKGROUND OF THE INVENTION

The present invention relates to a license plate bracket. Specifically, it relates to a license plate bracket configured to removably secure to a support surface, such as a windshield.

Many states have laws requiring drivers to display a license plate at both the front and rear of a vehicle. Additionally, should damage occur to the rear of the vehicle, or if the vehicle is a temporary replacement, a license plate may not be affixed to the bumper as is standard practice. In these cases, drivers often prop the license plate against the windshield or rear window in order to display the license plate, however changes in acceleration or direction can cause the license plate to fall or slide about the dashboard, potentially leading to an serious injury or expense in an accident if the license plate obscures the driver's vision. Typically, a second license plate can be affixed to the front bumper of a vehicle, however this may alter the aesthetics of the vehicle in a way the driver deems undesirable. Additionally, in cases where the driver is traveling through a state with such license plate laws, temporarily installing a license plate on the front bumper can be time consuming and frustrating. Therefore, a device that easily allows a user to secure a license plate to a front or rear vehicle window temporarily is desired.

In light of the devices disclosed in the known art, it is submitted that the present invention substantially diverges in design elements from the known art and consequently it is clear that there is a need in the art for an improvement to existing license plate brackets. In this regard, the instant invention substantially fulfills these needs.

SUMMARY OF THE INVENTION

In view of the foregoing disadvantages inherent in the known types of license plate brackets now present in the known art, the present invention provides a license plate bracket wherein the same can be utilized for providing convenience for the user when displaying and securing a license plate in a rear window or windshield.

The present system comprises a frame having a front wall, a rear wall, and a sidewall extending therebetween, defining a channel therein. An opening is disposed along an upper side of the frame providing access to the channel. A first cutout is disposed in the front wall, the first cutout dimensioned to expose identifying information of a license plate disposed within the channel. A plurality of fasteners are affixed to the front wall at each corner thereof, the plurality of fasteners configured to removably secure the frame to a support surface. In some embodiments, the rear wall comprises a second cutout therein, the second cutout in alignment with the first cutout. In another embodiment, the plurality of fasteners comprise suction cups having a cup portion and a stem extending therefrom. In other embodiments, each of the plurality of fasteners are removably securable to the front wall via a plurality of apertures dimensioned to secure the stem of each fastener therein via friction fit. In yet another embodiment, the plurality of apertures taper from a first end thereof towards a second end thereof, such that the first end comprises a larger diameter than the second end, wherein the first end is dimensioned to receive the stem therein, and the second end is dimensioned to secure the stem via friction fit. In some embodiments, the first cutout comprises a plurality of protrusions extending from each corner of the front wall. In another embodiment, a plurality of tabs extend from a rear surface of the front wall, the plurality of tabs configured to engage a license plate via friction fit. In other embodiments, the plurality of tabs are spring-biased towards the channel. In yet another embodiment, the first cutout comprises a transparent window therein.

BRIEF DESCRIPTION OF THE DRAWINGS

Although the characteristic features of this invention will be particular pointed out in the claims, the invention itself and manner in which it may be made and used may be better understood after a review of the following description, taken in connection with the accompanying drawings wherein like numeral annotations are provided throughout.

FIG. 3 shows a close-up view of the aperture and suction cup of an embodiment of the license plate bracket.

FIG. 4 shows a cross-sectional view of a tab of an embodiment of the license plate bracket.

DETAILED DESCRIPTION OF THE INVENTION

Figure 1:
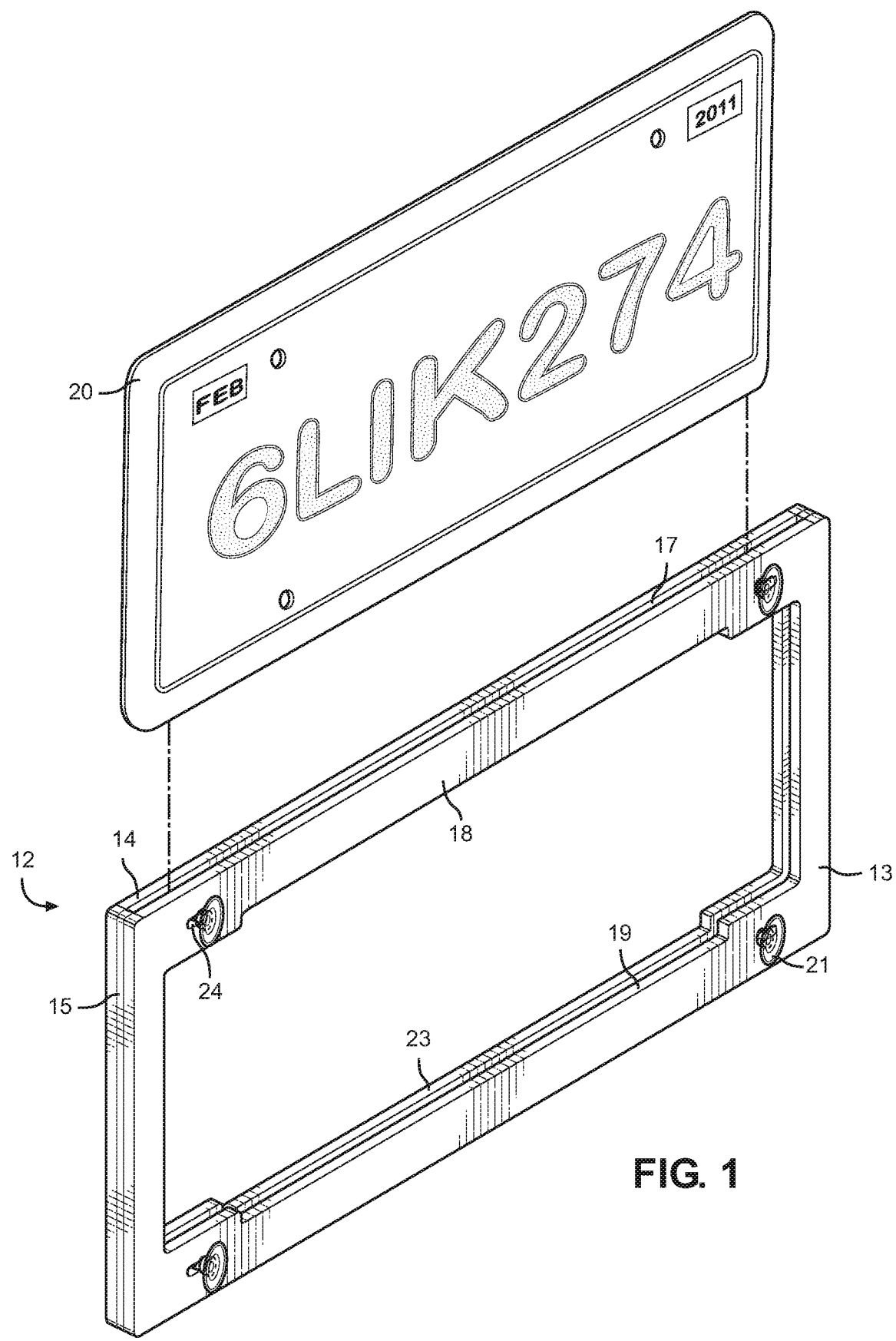
FIG. 1 shows an exploded view of an embodiment of the license plate bracket.

Reference is made herein to the attached drawings. Like reference numerals are used throughout the drawings to depict like or similar elements of the license plate bracket. The figures are intended for representative purposes only and should not be considered to be limiting in any respect.

Referring now to FIG. 1, there is shown an exploded view of an embodiment of the license plate bracket. The license plate bracket comprises a frame 12 having a front wall 13, a rear wall 14, and a sidewall 15 extending therebetween. The front wall 13 is separated from the rear wall 14 by the sidewall 15 such that a channel (as shown in FIG. 4, 16) forms therebetween. In the illustrated embodiment, the sidewall 15 extends about three sides of the front and rear walls 13, 14 such that opposing lateral sides of the frame 12 and a bottom end of the frame 12 are enclosed thereby. In this way, an object inserted into the channel is secured within the frame 12. An opening 17 is disposed along an upper side 18 of the frame 12. The opening 17 provides access to the channel, such that a license plate 20 can be inserted therethrough. In some embodiments, the channel is dimensioned to removably secure the license plate 20 therebetween via friction fit.

In the illustrated embodiment, the front wall 13 further comprises a first cutout 19 therein, the first cutout 19 configured to expose identifying information disposed on the license plate 20. In this way, the identifying information on the license plate 20 is still visible, while the license plate 20 is secured within the frame 12. In the illustrated embodiment, the rear wall 14 further comprises a second cutout 23 therein, a perimeter of the second cutout 23 aligned with a perimeter of the first cutout 19. In this way, the first and second cutouts 19, 23 are configured to provide a secure grip to a license plate 20 secured within the channel, such that the user can easily remove and replace the license plate 20 as needed, should the user move the frame 12 from one vehicle to another. In the illustrated embodiment, each cutout 19, 23 comprise a rectangular shape extending across at least 75% of the length of the front and rear walls 13, 14. Furthermore, in the illustrated embodiment, the front and rear walls 13, 14 each comprise a pair of perpendicular cutouts forming a protrusion (as shown in FIG. 2, 28) at each corner thereof.

The license plate bracket further comprises a plurality of fasteners 21 affixed to the front wall 13. The plurality of fasteners 21 are configured to removably secure the frame 12 to a support surface, such as a windshield or rear window of a vehicle. In the illustrated embodiment, the plurality of fasteners 21 are removably securable to the front wall 13. In this way, the user can easily disassemble the frame 12 for easier storage and transport. In the illustrated embodiment, the plurality of fasteners 21 comprise suction cups, however in alternate embodiments, other fasteners capable of removably securing the frame 12 to a support surface are contemplated, including, but not limited to, hook and loop systems, reusable adhesives, and the like. In the illustrated embodiment, the frame 12 further comprises a plurality of apertures 24 disposed through the front wall 13. The plurality of apertures 24 are configured to removably receive the plurality of fasteners 21 therein. In some embodiments, the plurality of apertures 24 are disposed on the rear wall 14 as well, such that the frame 12 can be reversible.

Figure 2:
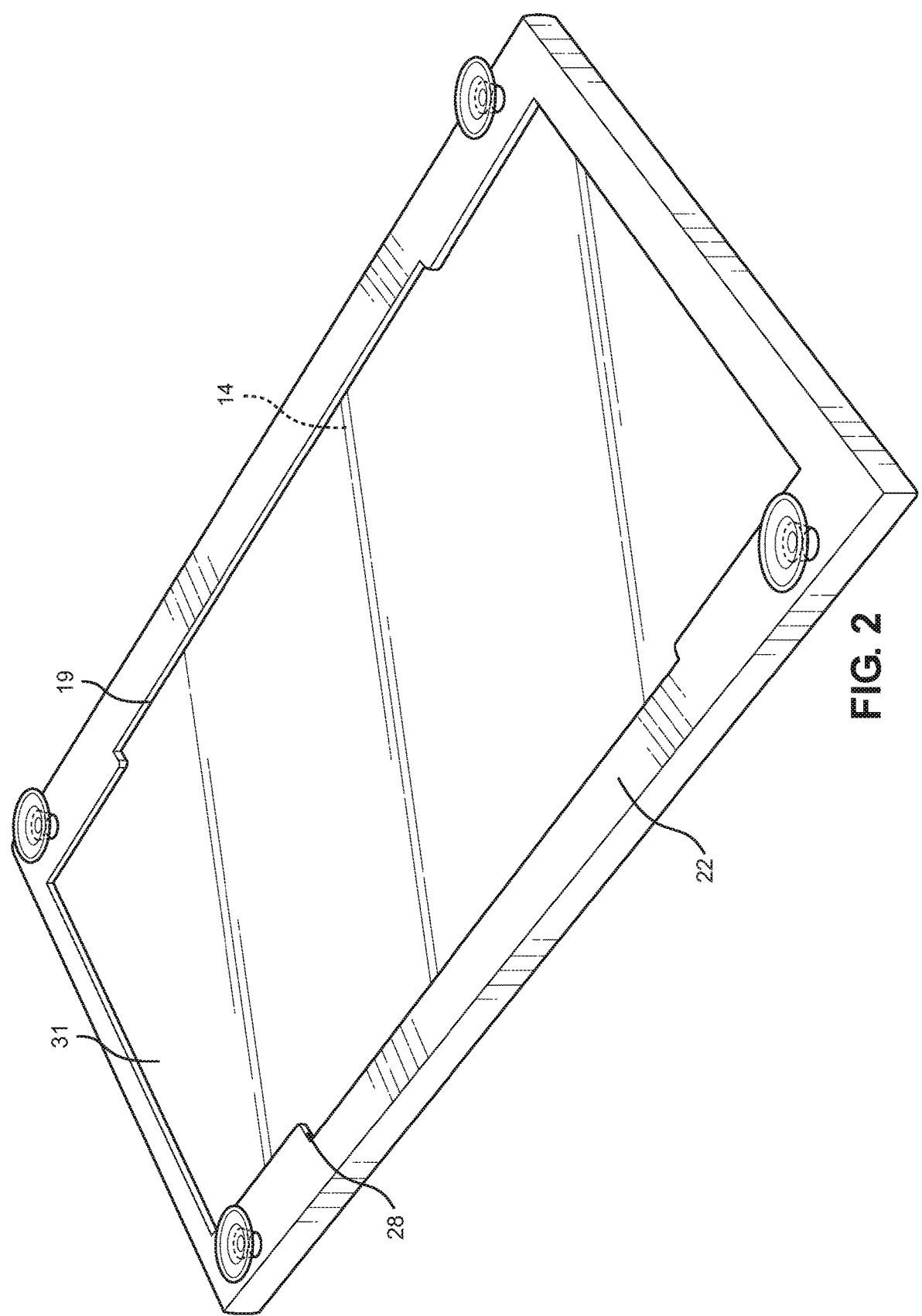
FIG. 2 shows a perspective view of an embodiment of the license plate bracket.

Referring now to FIG. 2, there is shown a perspective view of an embodiment of the license plate bracket. In the illustrated embodiment, the rear wall 14 comprises a solid construction, such that the rear wall 14 securely retains the license plate within the license plate bracket. Additionally, in the shown embodiment, the first cutout 19 further comprises a transparent window 31 therein, such that the transparent window 31 provides visibility to the identifying information of the license plate. In this way, the license plate disposed within the license plate bracket is protected from damage due to contact therewith, such as scratches, dents, and the like. In some embodiments, the transparent window 31 further comprises a material configured to filter ultraviolet light, such that incoming ultraviolet light does not damage the license plate or cause the identifying information to fade due to constant exposure to ultraviolet light. As most windshields and rear windows are installed at an angle, directly affixing the license plate bracket to the windshield or rear window can cant the license plate directly towards sunlight, increasing the exposure to ultraviolet light that would otherwise impact the license plate if located on a bumper of a vehicle.

In the illustrated embodiment, the first cutout 19 further comprises a plurality of protrusions 28 extending from each corner 22 of the front wall. The plurality of protrusions 28 are configured to provide additional securement and retention to the license plate to account for variations in size due to manufacturing and wear and tear that may result in the license plate falling through the first cutout 19. Additionally, the plurality of protrusions 28 provide aesthetic appeal and further serve to draw the eye directly to the identifying information located on the license plate. In some embodiment, each of the plurality of protrusions 28 further comprise a tab (as shown in FIG. 4, 29) thereon, the tab configured to engage an opening disposed on the license plate, such as the openings configured to receive fasteners therethrough to removably secure the license plate to a vehicle bumper. In this way, the plurality of protrusions 28 provide a surface upon which the tab is secured so as to better align the tab with the openings of the license plate.

Referring now to FIG. 3, there is shown a close-up view of the aperture and suction cup of an embodiment of the license plate bracket. In the illustrated embodiment, the plurality of fasteners 21 comprise a suction cup having a cup portion and a stem 25. The stem 25 extends perpendicularly away from an apex of the cup portion, such that the cup potion is positioned to engage a surface parallel to the license plate bracket when the stem 25 is removably secured within one of the plurality of apertures. In the illustrated embodiment, the plurality of apertures comprise a first end 26 and a second end 27, wherein the first end 26 tapers towards the second end 27 such that the first end 26 comprises a larger diameter than the second end 27. The first end 26 is dimensioned to receive the stem 25 therein, whereas the second end 27 is dimensioned to removably secure the stem 25 therein via friction fit. In this way, the user can easily insert the stem 25 and slide the stem 25 from the first end 26 towards the second end 27 to secure the stem 25 therein. In the illustrated embodiment, the plurality of apertures are disposed on each corner 22 of the frame, such that the license plate bracket is evenly supported by the plurality of fasteners 21, thereby minimizing stress on each individual fastener 21 and decreasing the likelihood of disengagement with the support surface.

Referring now to FIG. 4, there is shown a cross-sectional view of a tab of an embodiment of the license plate bracket. In the illustrated embodiment, the license plate bracket further comprises a plurality of tabs 29 (also shown in FIG. 3, 29) affixed to a rear surface 30 of the front wall 13, wherein the plurality of tabs 29 extend into the channel 16. In this way, the plurality of tabs 29 are configured to engage the license plate inserted into the channel 16 via friction fit, such that the license plate is secured therein. In an alternate embodiment, the plurality of tabs 29 are configured to engage an opening on the license plate, such as the openings configured to receive fasteners therethrough to removably secure the license plate to a rear bumper. In the illustrated embodiment, the plurality of tabs 29 are angled away from perpendicular of the front wall 13, such that the plurality of tabs 29 are spring-biased towards the upper opening of the channel 16. Then, when a license plate is inserted into the channel 16, the plurality of tabs 29 are pushed down and towards the front wall 13. In this way, the license plate can easily be inserted, however, the plurality of tabs 29 must be depressed to disengage the plurality of tabs 29 from the license plate should the user desire to remove the license plate from the channel 16. This ensures that the license plate remains within the license plate bracket until the user desires to remove it. In some embodiments, the plurality of tabs 29 are affixed to each corner of the license plate bracket, however in alternate embodiments, the plurality of tabs 29 are only disposed along the rear surface 30 at the upper side of the front wall 13.

In one use, the user inserts the license plate through the opening and into the channel, such that the identifying information is exposed by the first cutout. In embodiments similar the illustrated embodiment of FIG. 1, wherein the plurality of fasteners are removably securable to the frame, the user can then insert the stem of each of the plurality of fasteners into each of the plurality of fasteners to removably secure the fastener therein. The license plate bracket can then be removably secured to a support surface, such as a windshield or rear window. Should the user desire to remove the license plate, such as when moving the license plate bracket between vehicles, the user can grip the license plate through the first and second cutouts and remove the license plate from the channel. In some embodiments, the user may first be required to depress each of the plurality of tabs to ensure that the license plate is not engaged thereby before removing the license plate. The process can then be repeated with the license plate of the alternate vehicle.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A license plate bracket, comprising:
   a frame having a front wall, a rear wall, and a sidewall extending therebetween, defining a channel therein;
   an opening disposed along an upper side of the frame providing access to the channel;
   a first cutout disposed in the front wall, the first cutout dimensioned to expose identifying information of a license plate disposed within the channel;
   a plurality of fasteners affixed to the front wall at each corner thereof, the plurality of fasteners configured to removably secure the frame to a support surface;
   a plurality of apertures disposed through the front wall, wherein each of the plurality of apertures are configured to receive one of the plurality of fasteners therethrough;
   wherein a stem comprises a neck having a narrower diameter than that of a distal end of the stem, wherein the neck is configured to removably secure within the plurality of apertures;
   wherein each distal end is disposed within the channel when the plurality of fasteners are removably secured within the plurality of apertures.

2. The license plate bracket of claim 1, wherein the rear wall comprises a second cutout therein, the second cutout in alignment with the first cutout.

3. The license plate bracket of claim 1, wherein the plurality of fasteners comprise suction cups having a cup portion affixed to the stem.

4. The license plate bracket of claim 1, wherein each of the plurality of apertures taper from a first end thereof towards a second thereof, such that the first end comprises a larger diameter than the second end, wherein the first end is dimensioned to receive the stem therein, and the second end is dimensioned to secure the stem via friction fit.

5. The license plate bracket of claim 1, wherein the first cutout comprises a plurality of protrusions extending from each corner of the front wall.

6. The license plate bracket of claim 1, further comprising a plurality of tabs extending from a rear surface of the front wall, the plurality of tabs configured to engage a license plate via friction fit.

7. The license plate bracket of claim 6, wherein the plurality of tabs are spring-biased towards the channel.

8. The license plate bracket of claim 1, wherein the first cutout comprises a transparent window therein.

9. The license plate bracket of claim 8, wherein the transparent window comprises material configured to filter ultraviolet light, such that ultraviolet light cannot pass through the transparent window into the channel.

10. The license plate bracket of claim 1, wherein the rear wall comprises a second cutout therein, the second cutout in alignment with the first cutout.

11. The license plate bracket of claim 1, further comprising a plurality of apertures disposed through the front wall, wherein each of the plurality of apertures are configured to receive one of the plurality of fasteners therethrough.

12. The license plate bracket of claim 1, wherein the plurality of fasteners comprise suction cups having a cup portion and a stem extending therefrom.

13. The license plate bracket of claim 1, wherein each of the plurality of apertures taper from a first end thereof towards a second thereof, such that the first end comprises a larger diameter than the second end, wherein the first end is dimensioned to receive the stem therein, and the second end is dimensioned to secure the stem via friction fit.

14. The license plate bracket of claim 1, wherein the first cutout comprises a plurality of protrusions extending from each corner of the front wall.

15. The license plate bracket of claim 1, wherein the first cutout comprises a transparent window therein.

16. The license plate bracket of claim 15, wherein the transparent window comprises material configured to filter ultraviolet light, such that ultraviolet light cannot pass through the transparent window into the channel.

17. A license plate bracket, comprising:
   a frame having a front wall, a rear wall, and a sidewall extending therebetween, defining a channel therein;
   an opening disposed along an upper side of the frame providing access to the channel;
   a first cutout disposed in the front wall, the first cutout dimensioned to expose identifying information of a license plate disposed within the channel;
   a plurality of fasteners affixed to the front wall at each corner thereof, the plurality of fasteners configured to removably secure the frame to a support surface;
   a plurality of tabs extending from a rear surface of the front wall such that an acute angle is formed between the front wall and each tab of the plurality of tabs;
   wherein each tab is selectively movable between a compressed configuration and an extended configuration, wherein the angle between each tab and the front wall is less when in the compressed configuration;
   wherein each tab of the plurality of tabs is spring biased towards the extended configuration, such that each tab is configured to engage the license plate via frictional engagement when in the extended configuration.

* * * * *